United States Patent [19]

Aste et al.

[11] Patent Number: 4,761,129
[45] Date of Patent: Aug. 2, 1988

[54] DEVICE FOR CHANGING COLOR DURING THE EXTRUSION OF A SHEATH AROUND A CONDUCTOR

[75] Inventors: Robert Aste, Yverdon-Les-Bains; Peter Bloch, Montcherand, both of Switzerland

[73] Assignee: Swisscab E.A. Schoen S.A., Yvonand, Switzerland

[21] Appl. No.: 80,556

[22] Filed: Jul. 7, 1987

[51] Int. Cl.$^4$ ............................................. B29C 47/04
[52] U.S. Cl. ................................. 425/133.1; 264/169; 264/174; 425/462; 425/382.3
[58] Field of Search ...................... 425/130, 185, 131.1, 425/190, 133.1, 76, 376 R, 146, 376 B, 461, 462, DIG. 243, 557; 264/39, 169, 174, 167, 171, 73, 75

[56] References Cited

U.S. PATENT DOCUMENTS

| | | | |
|---|---|---|---|
| 3,324,739 | 6/1967 | Schrenk | 425/131.1 |
| 3,486,195 | 12/1969 | Greenwood et al. | 425/131.1 |
| 3,979,170 | 9/1976 | Monnet | 425/130 |
| 4,164,956 | 8/1979 | Takahashi et al. | 425/562 |
| 4,182,601 | 1/1980 | Hill | 425/133.1 |

FOREIGN PATENT DOCUMENTS 1222656 9/1960 Fed. Rep. of Germany .
2400424 3/1979 France .

Primary Examiner—Jay H. Woo
Assistant Examiner—Timothy W. Heitbrink
Attorney, Agent, or Firm—Frost & Jacobs

[57] ABSTRACT

Apparatus for extruding a sheath of synthetic material around a conductor, comprising an extruder head with two inlet conduits respectively connected to two orifices traversed by the conductor, and distributor means for selectively connecting the inlet conduits to a first and second extruder, the distributor means including a distributor communicating with the two extruders and to a first and second inlet conduit of the extruder head, and means for control of the distributor, the distributor having a mobile member which includes at least one pair of direct channels respectively providing communication of the first extruder with the first inlet conduit and of the second extruder with the second inlet conduit in a predetermined position of the mobile member, and a pair of inverted channels respectively providing communication of the first extruder with the second inlet conduit and of the second extruder with the first inlet conduit in another position of the mobile member. Different colors of synthetic material may be supplied to the respective inlet conduits, and the colors may be changed during production without wasting material.

10 Claims, 3 Drawing Sheets

DEVICE FOR CHANGING COLOR DURING THE EXTRUSION OF A SHEATH AROUND A CONDUCTOR

BACKGROUND OF THE INVENTION

1. Field of the Invention

The present invention concerns a device for changing colour during the extrusion of a sheath of synthetic material around a conductor, comprising an extruder head provided with at least two inlet conduits for synthetic material, connected respectively to two orifices traversed by a conductor to allow extruding around the latter a sheath formed of two layers, and distributing means for selectively connecting these inlet conduits to a first and a second extruder of snythetic material.

2. Description of the Related Art

In addition to the great variety in the types of insulated electric wires and cables called for by the utilizers from the cable making industry, each type of cable or wire may have a sheath of various colours for purposes of identification of the conductors. Up to eleven colours may be utilized, alone or in combination. Now, the utilizers often require the manufacturers, notably in the field of special cables, to produce relatively small quantities of wires insulated by a sheath of a determined colour, which poses enormous production problems. As a matter of fact, it is practically impossible to stock all types of products and in all of the colours.

In a line for insulating by extrusion of a sheath of synthetic material, each time the colour of the sheath has to be changed, the extruder heads and the extruders which feed them with the synthetic material under pressure must be entirely purged, in order that the preceding colour may not influence the new colour of the sheath extruded onto the conductor. This purging operation generally neccessitates stopping the insulating line, which means a significant loss in the output of the production equipment. In addition, this purging brings about an important amount of wastes, which are generally not reutilizable since their colour is not pure. Now, these raw materials are relatively costly and represent an important part of the cost of the final product. Consequently, each colour changing operation increases the unit price of the product, particularly for a product made in small quantity.

A solution allowing to avoid stopping production consists in charging into the extruder the synthetic material of the new colour while continuing to produce a sheath of the old colour with the material remaining in the machine. However, a relatively significant amount of material having a mixed colour nevertheless subsists and has to be discharged either by purging while stopping production, or by producing a reject sheath.

Another solution is provided by the patent application DE-B No. 1,222,656, which describes a device of the type indicated in the preamble. The two extruders are disposed on both sides of the head and are each selectively connected to two respective inlet conduits each corresponding to one layer of the sheath, via a distributor with a pivoting plug which directs the material towards one of the conduits, the other then not being utilized. There are thus two distributors and four inlet conduits. To effect changing of the apparent colour of the sheath, the material having the new colour is previously charged into the extruder which feeds the inner layer and the extrusion is pursued until this material has completely replaced the preceding one in the extruder and in the extruder head. The production line is then briefly stopped and the two distributors are actuated to interchange the feeds, the material having the new colour thus passing from the inner layer to the outer apparent layer of the sheath when the extrusion recommences.

A drawback of this device is the fact that the production line has to be stopped. Another drawback consists of the inlet conduits which are not utilized, during a period which may be quite long. As the material which stagnates in these conduits can not be purged, it will produce a certain length of reject sheath at the next colour change, but it particularly tends to be decomposed, which may foul up or clog the conduits or the dies of the extruder head. Finally, the described construction is relatively complicated and neccessitates means for ensuring the synchronism of the two distributors.

SUMMARY OF THE INVENTION

The present invention thus has as object to remedy the drawbacks meentioned above, by providing a device for changing colour during the extrusion of a sheath, enabling to avoid stops of the production line, to eliminate to a large extent the production of wastes and to thus ensure that small lengths may be produced in an economical manner.

To this end, the invention provides for an extrusion device of the type indicated in the preamble characterized in that the distributing means comprise a distributor connected on one hand to the two extruders and on the other hand to a first and a second inlet conduit of the head and means for control of the distributor, the latter being provided with a mobile member which includes at least one pair of direct channels respectively providing communication of the first extruder with the first inlet conduit and of the second extruder with the second inlet conduit in a determined position of said mobile member, and a pair of inverted channels respectively providing communication of the first extruder with the second inlet conduit and of the second extruder with the first inlet conduit in another position of said mobile member.

Said mobile member further preferably includes purging channels adapted to provide communication of the first and/or the second extruder with discharge conduits.

According to a first embodiment, said mobile member is a rotating plug having a substantially cylindrical form. The extremities of the inverted channels are preferably offset by 90° distributed with respect to the extremities of the direct channels, and the means for control of the distributor include a motor operating in a single direction of rotation.

According to another embodiment, said mobile member is a slide adapted for sliding movement in the body of the distributor. In addition, this slide may also be pivoting.

BRIEF DESCRIPTION OF THE DRAWINGS

The present invention and its advantages will be better understood with the help of the description of a preferred embodiment and of different variants, this description being given by way of example and with reference to the accompanying drawings, wherein.

DESCRIPTION OF THE PREFERRED EMBODIMENT

Figure 1:
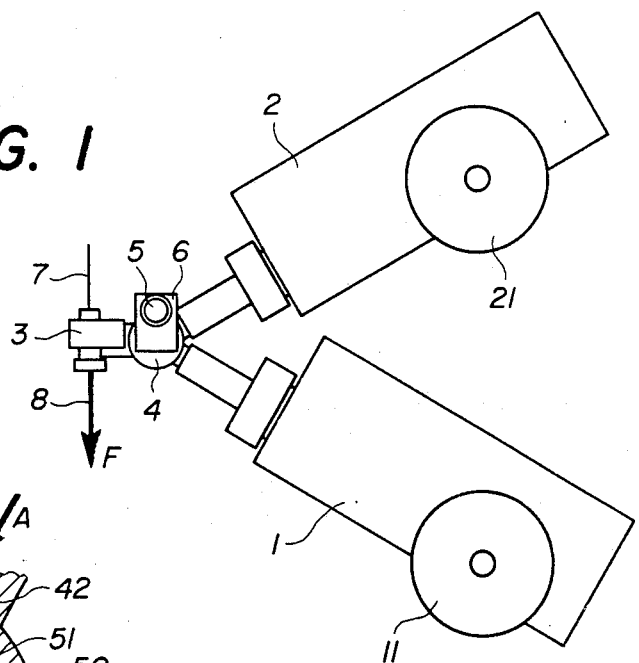
FIG. 1 is a general plan view of a device according to the invention.

With reference to FIG. 1, the device according to the invention comprises a first extruder 1 and a second extruder 2, an extruder head 3 and a distributor 4 which is connected both to the two extruders 1 and 2 and to the extruder head 3. The distributor 4 is notably connected by means of an electric motor 5 and a reducing gear 6 equipped with an indexing system. The extruders 1 and 2 are of conventional type; they include a respective feed hopper 11, 21 into which the synthetic raw material is poured which the extruder will heat and deliver under pressure to the extruder head 3, in a manner which will be described further on in more detail. A conductor 7 passes according to the arrow F through the extruder head 3, by means of which an insulating sheath 8 of synthetic material is extruded around the conductor 7.

The extruder head 3 represented schematically in the figures is a head of the well known double layered type, enabling to form on the conductor 7, in a single extruding operation through two successive dies surrounding the conductor 7, a sheath of synthetic material comprising an inner layer 81 and an outer layer 82 which may be of different colours, but of which only the outer layer 82 is visible. This extruder head may if needed also include an additional device for inlaying coloured identifying bands on the outer surface of the sheath. In all cases, the extruder head 3 includes a first inlet conduit 31, connected to the first die to normally deliver to it the synthetic material destined to form the outer layer 82 of the sheath, and a second inlet conduit 32 connected to the second die to normally deliver to it the synthetic material destined to form the inner layer 81.

The distributor 4, in its preferred embodiment illustrated in FIGS. 2 to 7, includes a metallic body 41 provided with a central essentially cylindrical bore, with two inlet conduits 42 and 43 which are respectively connected to the extruders 1 and 2, and with two outlet conduits 44 and 45 which are respectively connected to the inlet conduits 31 and 32 of the extruder head. In the example illustrated here, the body 41 also includes two lateral discharge conduits 46 and 47. These six conduits open into the the central bore of the body 41 at points which are situated in the same transversal plane with respect to this bore and which are offset to one another by 60°.

An essentially cylindrical plug 50 is rotatably mounted in the central bore of the body 41. This plug contains several groups of channels adapted to make the the inlet conduits 42 and 43 communicate selectively with the outlet conduits or the discharge conduits of the distributor. Two direct channels 51 and 52, parallel to each other, are adapted to connect on one hand the inlet conduit 42 to the outlet conduit 44, and on the other hand the inlet conduit 43 to the outlet conduit 45, in the position of the plug 50 represented in FIG. 2. In this manner, the distributor 4 makes the first inlet 31 of the extruder head communicate with the extruder 1, supplying material according to the arrow A. At the same time, the second extruder, supplying material according to the arrow B, is made to communicate with the second inlet 32 of the extruder head.

Figure 2:
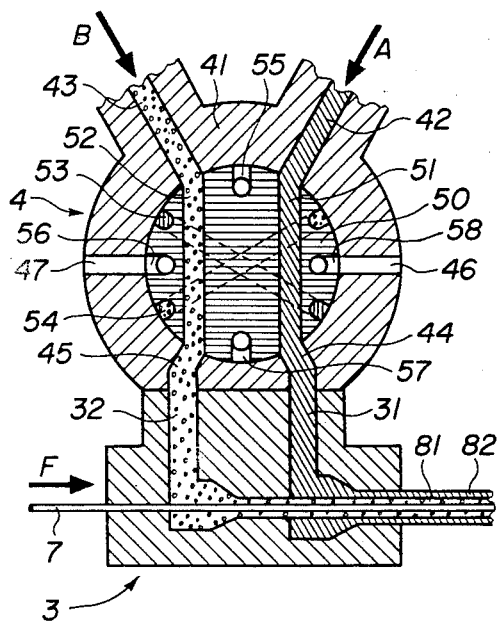
FIG. 2 is a schematic sectional view of an extruder head and a rotary distributor belonging to the device in FIG. 1 and represented in a first production position.
Figure 3:
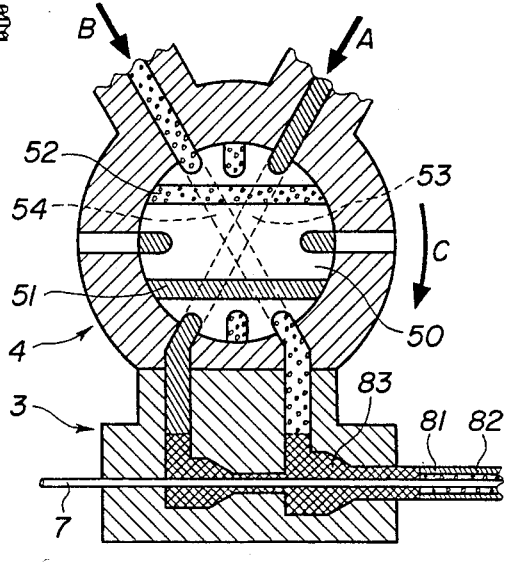
FIGS. 3 to 5 are views analogous to FIG. 2 and representing other production positions.

The plug also contains two inverted channels 53 and 54 which are also disposed so as to communicate simultaneously with the inlet conduits 42 and 43, but which are crossed without intersecting each other at the axis of the plug so as to provide communication respectively, in the position illustrated in FIG. 3, of the inlet conduit 42 with the outlet conduit 45, and of the inlet conduit 43 with the outlet conduit 44. In this position of the plug 50, the first extruder feeds the inner layer 81 of the sheath according to the arrow A, while the second extruder feeds the outer layer 82 according to the arrow B. The plug 50 must carry out a rotation of 90° to pass from the position of FIG. 2 to that of FIG. 3 and conversely.

The plug 50 also contains four purging channels 55 to 58 which each include an inlet orifice situated on the periphery of the plug, in the same plane as the orifices of the channels 51 to 54, and an outlet orifice situated on a front face of the plug. It has to be remarked that all of the orifices situated on the periphery of the plug are offset by 30° to each other, so that at each rotation of 30° of the plug 50, each of the inlet conduits 42 and 43 communicates with a new channel.

The plug 50 is actuated and positioned in an appropriate manner by the geared motor assembly 5, 6, the indexing device associated with it and possibly a remote control apparatus which coordinates the entire operation of the insulating line. These elements are known in the technical field here considered and their construction need not be described here in detail. Thanks to the symmetrical disposition of the channels in the plug, the latter may always rotate in the same direction, which allows the use of an inexpensive motor.

During operation, the distributor 4 is maintained at a sufficient temperature, as is also the extruder head 3, by means of heating elements (not shown) which are generally disposed on its outer faces. Thus, the synthetic material present in the different channels of the distributor remains sufficiently warm and fluid.

FIGS. 2 and 3 illustrate two essential phases of the process according to the invention. The direct position of the plug 50, represented in FIG. 2, is here considered as the starting point of the colour changing process, which essentially consists in changing the colour of the outer sheath 82, that is, the apparent colour of the sheathed cable. Before the change, the outer sheath 82 has the first colour, that is, that of the material delivered by the first extruder 1. In the phase illustrated in FIG. 2, the second extruder 2 already delivers material having the second colour, that is, the future colour of the outer sheath after the change.

The change of colour is brought about by a rapid rotation of 90° of the plug 50, which rotates in the direction of the arrow C in FIG. 3 and assumes the position represented in this figure. The synthetic materials delivered by the extruders 1 and 2 then circulate in the inverted channels 53 and 54 and drive before them, within the extruder head 3, the remainders of material of different colours present therein. Of course, a mixture of materials of different colour may occur, but with this device it is limited to the small volume of synthetic material present in the extruder head 3. This small volume 83 is represented by cross-hatching in FIG. 3. It is rapidly discharged from the head in the form of a reject sheath section which is relatively short. In fact, only the colour mixtures appearing in the outer layer 82 of the sheath are really inconvenient.

Before interchanging colours, when the plug 50 lies in the position in FIG. 2, the second extruder could deliver (according to the arrow B) a synthetic material of another colour. This extruder is simply charged with material of the second colour and the whole remainder of the old colour and the material in which the two succesive colours are mixed is allowed to go into the inner layer 81 of the sheath. As soon as the second extruder no longer delivers anything but material of unmixed colour, the colour change may be operated by causing the plug 50 to rotate by 90°, up to the position in FIG. 3. In this position, the first extruder may then be charged with a material of different colour.

One may easily provide in the body 41 of the distributor, at 30° on both sides of the conduits 46 and 47, purging orifices (not shown) which enable the two inverted channels 53 and 54 which are not utilized in the position in FIG. 2, and the two direct channels 51 and 52 which are not utilized in the position in FIG. 3, to be purged or cleaned from the exterior. Thus, synthetic material may not stagnate in any conduit of the device.

Figure 4:
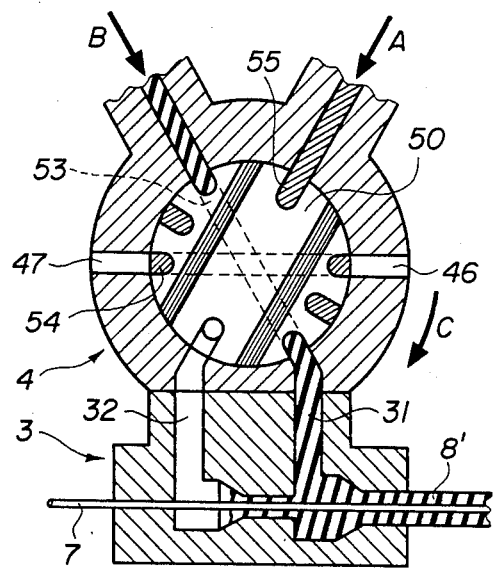
Figure 5:
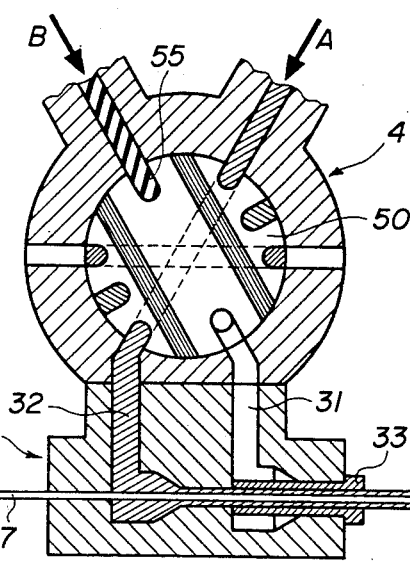

FIGS. 4 and 5 illustrate two modes of utilization of the device according to the invention for extruding a sheath which only includes a single layer. In the case of FIG. 4, the material delivered according to the arrow B by the second extruder is directed by the inverted channel 53 towards the first inlet conduit 31 of the extruder head, while the first extruder is in a situation for purging through the purging channel 55 of the plug 50, so that the second inlet conduit 32 of the extruder head is not fed. One thus extrudes a thick monolayered sheath 8' around the conductor 7. By a rotation of 60° of the plug 50 in the direction of the arrow C, one may then reestablish feeding of the inlet conduit 32 wiithout changing the apparent colour of the sheath.

In the case of FIG. 5, only the second inlet conduit 32 of the extruder head 3 is fed with synthetic material, according to the arrow A. A reducing die 33 adapted to the extruder head thus enables making a think monolayered sheath 8". Meanwhile, the second extruder is purged according to arrow B through the purging channel 55 of the plug 50.

Figure 6:
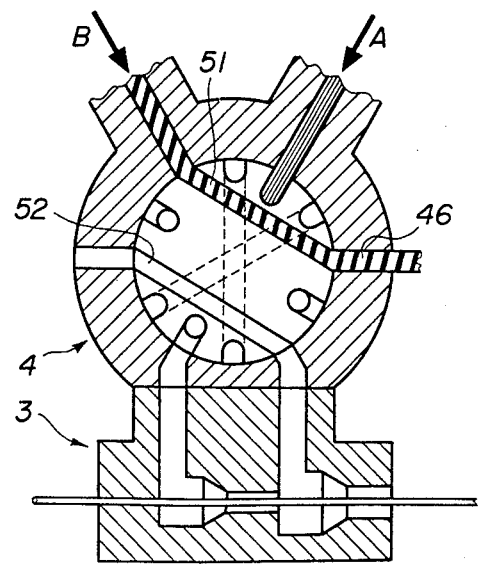
FIGS. 6 and 7 are views analogous to FIG. 2, representing two purging positions.
Figure 7:
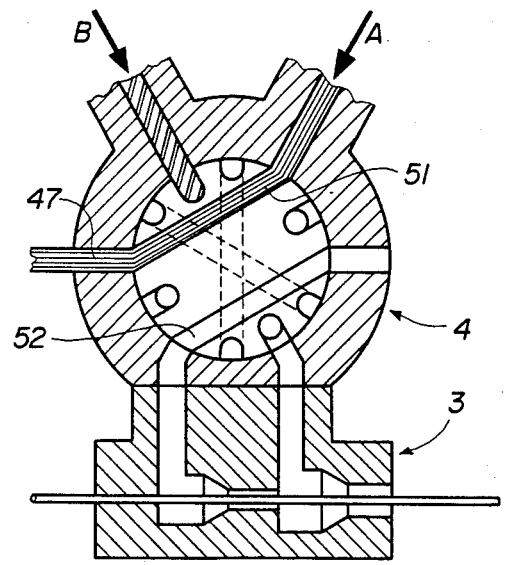

FIGS. 6 and 7 represent by way of example two other positions of the plug 55 enabling simultaneous purging of the first extruder (arrow A) and the second extruder (arrow B) during an interruption of production. It is evident that the discharge conduits 46 and 47 or other conduits disposed facing the front face of the plug 50 may be connected to devices for the recovery of synthetic material, notably for recycling it in the extruders. The positions of the distributor represented in FIGS. 6 and 7 also enable periodic purging to be effected in the direct channels 51 and 52.

Figure 8:
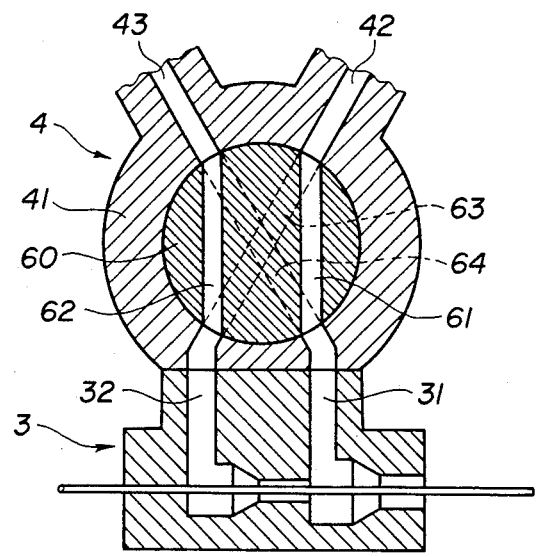
FIG. 8 is a schematic sectional view of a slide distributor.

FIG. 8 represents in cross-section an embodiment of a distributor 4 in which the mobile member is a slide 60 which slides in the body 41. The slide shown has an essentially cylindrical form which is easily machined, but it could evidently have a different cross-section.

Two parallel direct channels 61 and 62 are disposed in a transverse plane of the slide 60, while two inverted channels 63 and 64, similar to the channels 53 and 54 previously described, have respective orifices which are disposed in another transverse plane of the slide, so that sliding motion of the slide 60 in the direction perpendicular to the plane of the figure enables interchanging the supply of the inlet conduits 31 and 32 of the extruder head 3 from the inlet conduits 42 and 43 of the distributor. If needed, the slide 60 could also include purging channels, having their inlet orifices in other transverse planes than those of the conduits 61 to 64. According to another embodiment, it could also be pivoting and include purging channels opening respectively into the same planes as the direct channels and the inverted channels. Thus, a sliding movement corresponds to a change of colour and a pivoting movement corresponds to a purging operation, and the control device is simpler since the displacements may be carried out between two positions defined by stops.

The preceding description shows that a device according to the invention enables changes of colour to be effected very rapidly, without stopping production and without having significant amounts of waste of raw material or of reject products. In addition, this device is of particularly simple and inexpensive design and it may be easily subjected to automatic control.

The present invention is not limited to the embodiments descibed above by way of example, but it may be the object of various modifications and variants obvious to a person skilled in the art. For example, to facilitate making the inverted channels in the plug, the outlet conduits 44 and 45 of the distributor might be disposed in different transverse planes. Moreover, a similar device may be utilized for colour changes of the superficial identifying bands.

We claim:

1. Apparatus for extruding a sheath of synthetic material around a conductor, said apparatus comprising an extruder head provided with at least two inlet conduits for synthetic material respectively connected to two orifices traversed by said conductor to permit extruding around said conductor a sheath formed of two layers of said material, and distributing means for selectively connecting said inlet conduits to a first and a second extruder for synthetic material, said distributing means comprising a distributor communicating with said two extruders and to a first and a second inlet conduit of said extruder head and means for control of said distributor, said distributor being provided with a mobile member which includes at least one pair of direct channels respectively providing communication of said first extruder with said first inlet conduit and of said second extruder with said second inlet conduit in a predetermined position of said mobile member, and a pair of inverted channels respectively providing communication of said first extruder with said second inlet conduit and of said second extruder with said first inlet conduit in another position of said mobile member.

2. Apparatus according to claim 1, wherein said mobile member further includes purging channels adapted to provide selective communication of said first and said second extruders with respective discharge conduits in said distributor.

3. Apparatus according to claim 1, wherein said mobile member is a rotating plug having a substantially cylindric form.

4. Apparatus according to claim 3, wherein the extremities of said inverted channels are offset by an angle of 90° with respect to the extremities of said direct channels.

5. Apparatus according to claim 4, wherein said means for control of said distributor includes a motor operating in a single direction of rotation.

6. Apparatus according to claim 2, wherein said mobile member is a rotating plug having a substantially cylindrical form.

7. Apparatus according to claim 1, wherein said mobile member is a slide adapted for sliding movement within said distributor.

8. Apparatus according to claim 7, wherein said slide is also pivotable.

9. Apparatus according to claim 1, wherein said distributor is equipped with heating means.

10. Apparatus according to claim 2, wherein said mobile member is a slide adapated for sliding motion within said distributor.

* * * * *